Figure 3:
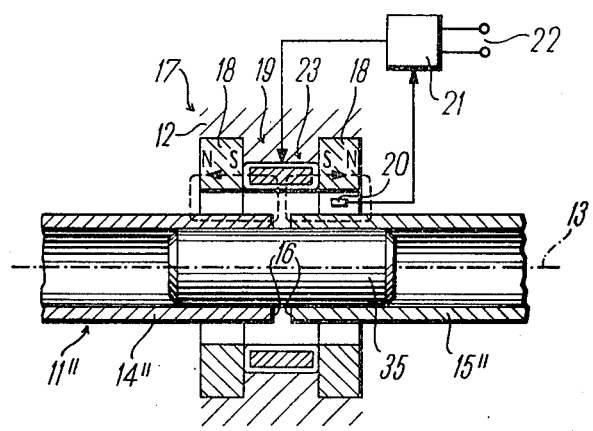

United States Patent [19]

Boden et al.

[11] 4,037,886
[45] July 26, 1977

[54] BEARINGS

[75] Inventors: Karl Boden, Juelich; Werner Geweke, Reutlingen, both of Germany

[73] Assignee: Padana AG, Zug, Switzerland

[21] Appl. No.: 572,668

[22] Filed: Apr. 29, 1975

[30] Foreign Application Priority Data

Apr. 30, 1974 Germany .............................. 2420814

[51] Int. Cl.² ............................................ F16C 39/00
[52] U.S. Cl. .................................................... 308/10
[58] Field of Search ......................................... 308/10

[56] References Cited

U.S. PATENT DOCUMENTS

| 3,694,041 | 9/1972 | Studer | 308/10 |
|---|---|---|---|
| 3,698,775 | 10/1972 | Gilbert | 308/10 |
| 3,787,100 | 1/1974 | Habermann | 308/10 |
| 3,845,997 | 11/1974 | Boden | 308/10 |
| 3,865,442 | 2/1975 | Studer | 308/10 |
| 3,877,761 | 4/1975 | Boden | 308/10 |
| 3,888,553 | 6/1975 | Wehde | 308/10 |
| 3,890,019 | 6/1975 | Boden | 308/10 |

Primary Examiner—R. Skudy
Attorney, Agent, or Firm—Harness, Dickey & Pierce

[57] ABSTRACT

A contactless magnetic bearing between two members, not necessarily relatively rotatable, comprises at least one magnet on one member cooperating with two ferromagnetic parts on the other member to exert a stabilizing effect in the direction of one degree of freedom due to oppositely directed mgnetic fluxes in the two parts parallel to the direction of the degree of freedom. The destabilizing effect in a direction transverse to the direction of the one degree of freedom can be countered by a lateral bearing, preferably an active bearing whose coil is arranged in the magnetic field of the magnet or magnets.

21 Claims, 7 Drawing Figures

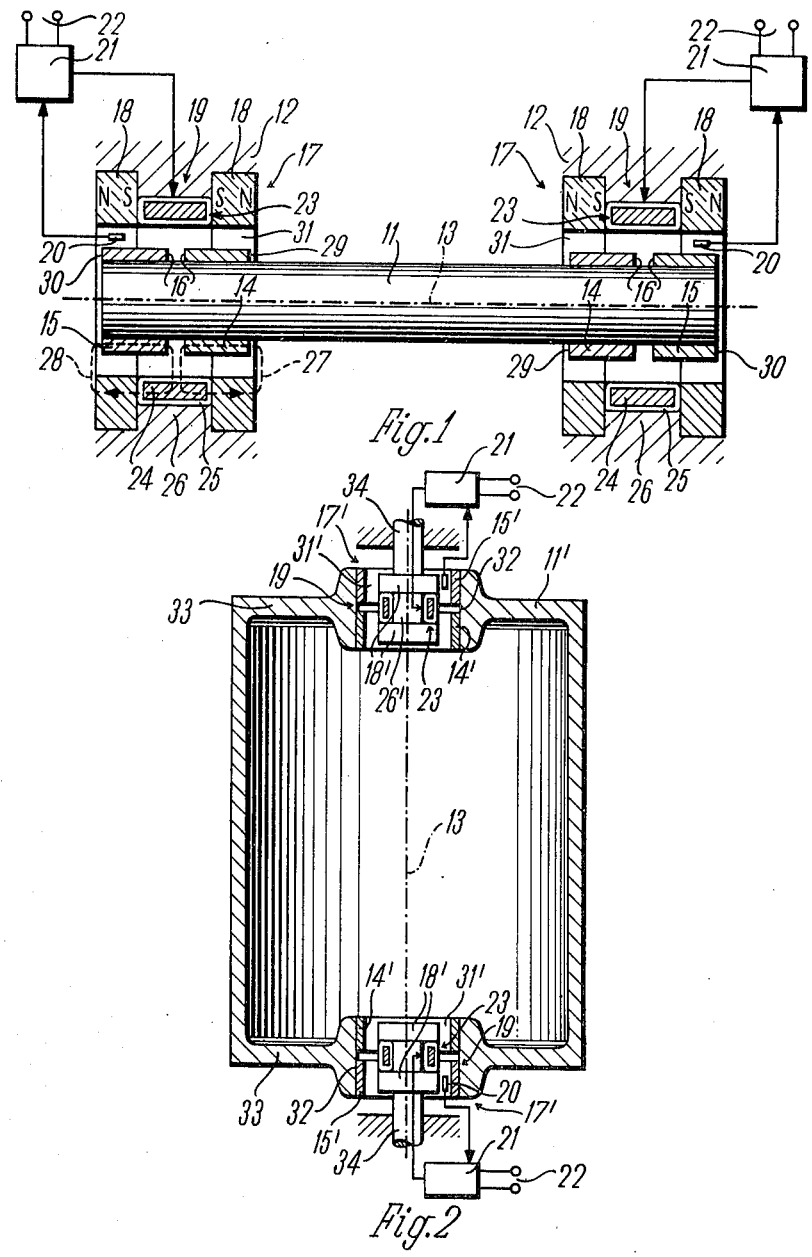

BEARINGS

The invention relates to a magnetic bearing such as an axial bearing, having at least one magnet which is arranged on one member of the bearing and which has a substantially contact magnetic field and co-operates with ferromagnetic material on the other member of the bearing to exert a stabilizing effect upon the bearing in the direction of the degree of freedom to be established between the members and a destabilizing effect in a direction at right angles thereto.

In the published German Patent Specification (Offenlegungsschrift) No. 2,213,522 the disclosure of which is incorporated in U.S. Pat. No. 3,845,997, entitled "Magnetic Bearing Assembly for Journalling a Rotor in a Stator" issued Nov. 5, 1974 in the names of Karl Boden, et al., there is described a bearing by which a rotor is journalled in a stator in which the radial journalling is effected by means of a lateral bearing actively controlled by way of sensors, a control device fed with direct current, and electromagnetic coils. A respective lateral bearing is mounted at each end of the rotor and the axial journalling is effected by an axially magnetized permanent magnet which co-operates with a projecting flange in the ferromagnetic material of the rotor.

This type is journalling operates very satisfactorily and is fully satisfactory for many purposes. However, for some fields of application it is necessary to obtain very great axial stiffness of the bearing, that is the force exerted by the bearing to oppose axial displacement should be very great per unit of displacement. High spring stiffness of the bearing is also frequently desired with other magnetic bearings.

Therefore, a feature of the invention is to provide a magnetic bearing of the type mentioned initially in which, with a relatively small expenditure on magnetic material and ferromagnetic material on the rotor, high spring stiffness and an increase in the axial carrying capacities can be provided in the case of a bearing which, in principle, is uncontrolled, i.e. a passive bearing.

In accordance with the invention, there is provided a magnetic bearing between two members, one of which has two ferromagnetic parts thereof, which parts respectively define two mutually facing shoulders, and the other of which members has at least one magnet arranged thereon so as to co-operate with said ferromagnetic parts and so that the magnetic field of the magnet or magnets has two flux paths which respectively enter or leave said two ferromagnetic parts at said shoulders and which pass respectively through the two ferromagnetic parts but in opposite directions therein to exert a stabilizing effect upon the bearing in a direction of one degree of freedom between the members, which direction is substantially parallel to said opposite flux path directions in the ferromagnetic material, said magnetic field being substantially constant and exerting a destabilizing effect on the bearing in a direction transverse to said direction of the one degree of freedom.

The bearing is particularly efficaceous if the ferromagnetic parts have outer end faces which face away from one another and which are located in the region of the magnetic field of the magnet or magnets.

Although it is possible to apply the invention in the case of a linear bearing, i.e. a bearing for members which are not rotatable relative to one another, it will generally be used to particular advantage as a bearing for two members which are rotatable relative to one another. Therefore, the bearing will be referred to as a rotary bearing and the members of the bearing will be referred to as rotor and stator in the following description even though relative rotation between the members may not be established. The bearing is also particularly suitable for high rotational speeds. Nevertheless, it can be used to mount two members which are stationary relative to one another. Normally, the magnet will also be mounted on the stationary member or stator and the ferromagnetic material will be mounted on the movable member or rotor, although it is possible to reverse this arrangement.

In accordance with an advantageous embodiment, the shoulders between the two ferromagnetic parts can define an interstice between two ferromagnetic rings or circular discs arranged on the other member of the bearing which is in the form of a rotor. When shoulders or interstices in the ferromagnetic material are referred to in the present context this always means that the ferromagnetic effect should vary as greatly as possible at this location. Thus, there must be an unsteadiness in the ferromagnetic action. In the simplest case, this is effected by end faces of rings, discs, etc. It is also unnecessary to provide a visible break since, for example, a non-ferromagnetic ring can be directly contiguous to the end faces of a ferromagnetic ring.

In accordance with a particularly preferred embodiment, two magnets may be provided which are spaced apart one behind the other in the direction of the degree of freedom to be established and which are polarized in alignment with this direction but in opposite directions to one another, and the shoulders between the ferromagnetic portions can be located in the region of the space between the magnets. In this embodiment, the spring stiffness and the load bearing capacity are increased to a particularly great extent in the direction of this degree of freedom, i.e. preferably in an axial direction. As a result of the like poles, i.e. mutually repulsive poles, which face one another, the lines of force are concentrated in the region between the two magnets and give rise to a particularly high magnetic flux density in the region of the interstice in the ferromagnetic material.

Furthermore, it is preferable to arrange the coil assembly of an actively controlled, electromagnetic lateral bearing in the magnetic field of the magnet or magnets which are provided for axial journalling, the lateral bearing being permeated by the two magnetic flux paths. The coils of actively controlled electromagnetic lateral bearings, particularly coils which are supplied with a control direct current by their control device, have a particularly high degree of efficacy when they are subjected to premagnetization. A high degree of premagnetization with a substantially constant magnetic field, which may also be produced permanent-magnetically, ensures that high restoring or damping forces can be obtained with small electrical regulating outputs and with low power losses. By arranging the coil in the magnetic field of the bearing in accordance with the invention, the magnetic flux density required for axial journalling is used for premagnetizing the lateral bearing. Thus, the increased effect of the axial bearing at the same time increases the effect of the radial or lateral bearing, so that a particularly advantageous bearing unit is provided. Thus, the magnetic fields permeating the air gap between the stator and the rotor for the purpose of journalling are the same for axial and radial journalling and are modulated only by the coil.

The above references made to a substantially constant magnetic field of the magnet, which is preferably a permanent magnet, means that its main function does not require a change in the constant magnetic field. It will be appreciated that the magnetic field changes upon axial displacement and, on the other hand, it is also possible to actively reset or readjust the axial position of the rotor by means of electromagnets or a combination of electromagnets and permanent magnets.

Advantageously, the coil can be located in the direction of the magnetic flux between the magnet or magnets and the regions contiguous to the shoulders between the ferromagnetic parts. It is thus ensured that the coils are permeated by magnetic flux.

If, in an embodiment having two magnets, the coil is located in the space between the two magnets, the coil is located in the region of the highest concentration of flux and is thus premagnetized to the greatest extent.

Advantageously, the ferromagnetic parts can be longer, in the direction of the degree of freedom to be established, then the magnets and/or may be offset towards the centre of the bearing relative to the magnets. By virtue of this measure, and in addition to the above-mentioned advantages, the magnetic flux is picked up to an optimum extent and stray losses are reduced.

The invention can provide an extremely compact bearing which, which a small structural volume and the use of a small quantity of material, ensures a bearing which has great spring stiffness and which is stable in a degree of freedom in both directions. It may be mentioned that the increase in the spring stiffness and the load carrying capacity of the bearing is greater than that which can be determined mathematically from the comparative values of the known bearings. Thus, not only is a pure doubling of the known bearing involved, but a functional cooperation takes place between the two bearings and results in a more than proportional increase in the load carrying capacity.

Figure 4:
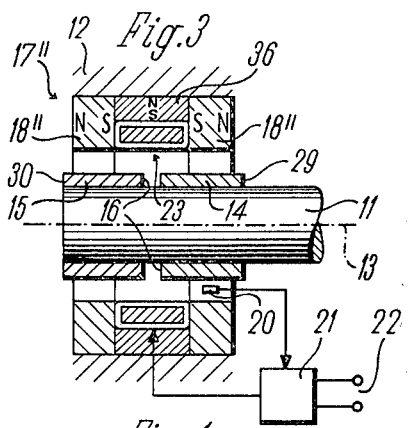
Figure 5:
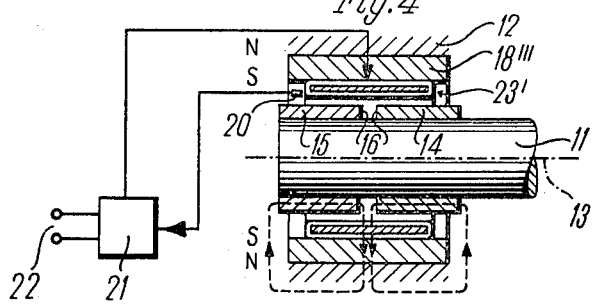
Figure 6:
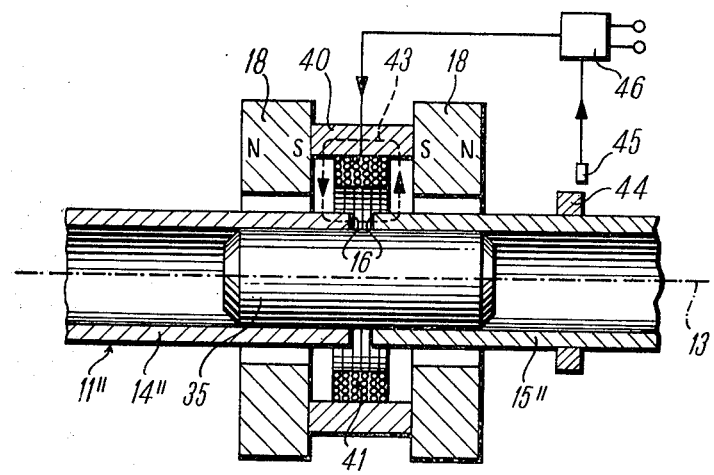
Figure 7:
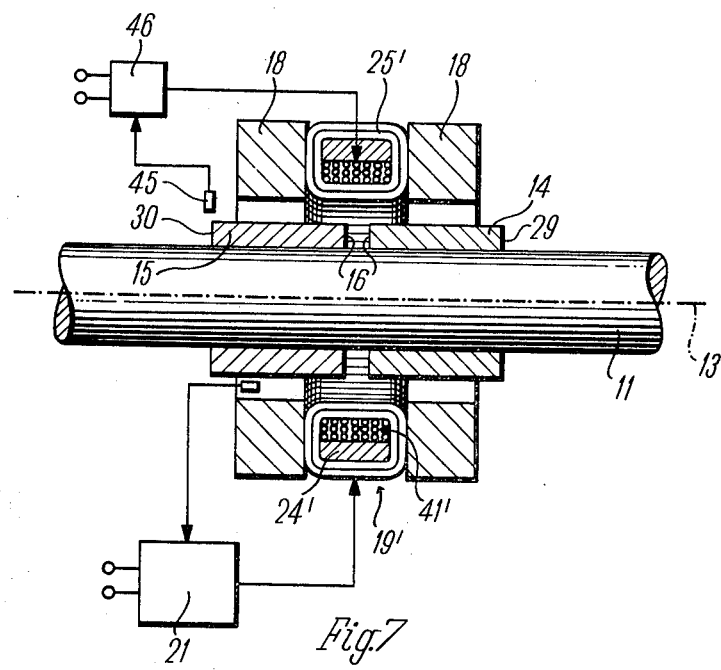

The invention is further described, by way of example, with reference to the accompanying diagrammatic drawings, in which:

FIG. 1 is a sectional view of a contactless electromagnetic bearing system having two substantially identical bearing units each comprising a passive magnetic axial bearing and an active, that is controlled, electromagnetic lateral bearing, FIG. 2 is a sectional view of an electromagnetic bearing system for a rotor, in which the bearing units are in the form of internal bearings, FIG. 3 is a sectional view of a bearing unit, corresponding substantially to one of the bearing units shown in FIG. 1, cooperating with a rotor portion of different construction, FIG. 4 is a sectional view to illustrate a modified construction of the bearing unit, FIG. 5 is a sectional view of a further variant of a bearing unit, FIG. 6 is a sectional view of a permanent magnetic axial bearing with the possibility of electromagnetic axial control, and FIG. 7 is a sectional view of a bearing unit comprising a regulable or controllable axial and radial bearing.

FIG. 1 shows the journalling of a rotor 11 on a stator 12. The rotor and the stator form the members which are to be journalled relative to one another. The rotor 11 has a horizontal rotary axis 13 and is made from a non-ferromagnetic material, such as aluminium. However, ferromagnetic material is arranged in the region of each end of the rotor, namely in two parts 14, 15 which are in the form of rings or tubular members which are axially spaced apart on the rotor. Thus, the two annular parts 14, 15 define respective shoulders 16 in the ferromagnetic material which face one another and which, in the present embodiment, are formed by the mutually facing end faces, of the two parts 14, 15. The axial space between the two parts 14, 15, which is formed between the shoulders 16, is significantly smaller than the axial length of the parts 14, 15 themselves. It may be mentioned that the parts 14, 15 may be made from any ferromagnetic material and, by reason of the properties of the bearing which will be described hereinafter, there is usually no need to use special material such as a material which is built up from individual insulated laminations or which is manufactured in the form of a moulded composition, simple steel usually being adequate. In any event, however, it is unnecessary to mount permanent magnetic material on the rotor in the described construction.

Identical bearing units 17 are arranged on the stator 12 in the region of the parts 14, 15 and surround the parts 14, 15. Each of these bearing units includes an axial bearing which, in this case, is passive, i.e. unregulated or noncontrolled and which, in the illustrated embodiment, includes two permanent magnets 18 and an electro-magnetically actively controlled radial or lateral bearing 19.

The basic principle of these radial bearings is described in the Published German Patent Specification (Auslegschfrift) No. 1,750,602), the disclosure of which is contained within U.S. Pat. No. 3,650,581, entitled Bearing Systems, issued Mar. 21, 1972 in the names of Karl Boden et al., the contents of which are incorporated herein by reference. Each radial bearing comprises contactless displacement pickups or sensors 20 which measure the lateral or radial displacement of the rotor and apply their measurement signals to an electronic control device 21 which is connected to an external source 22 of direct current and which amplifies the measurement signals and applies them, out of phase, as output signals in the form of a regulated direct current to electromagnetic means which, in the illustrated example, are in the form of an annular coil assembly 23 whose action and details are described in the published German Patent Specification (Offenlegungsschrift) No. 2,213,465, the disclosure of which is contained within U.S. Pat. 3,845,997 entitled Magnetic Bearing Assembly for Journalling a Rotor in a Stator" issued Nov. 5, 1974 in the names of Karl Boden, et al., the contents of which are also incorporated herein by reference. The annular coil assembly 23 has an annular ferromagnetic core 24 on which is wound a toroidal coil 25. The coil is subdivided into portions which can produce differing and/or oppositely directed magnetic fluxes in the ferromagnetic core and, by means of flux displacement, induce magnetic fields cooperating with the ferromagnetic parts of the rotor. The rotor is stabilized in a radial direction by these magnetic fields. All deviations of the rotor from a neutral or central position, resulting from oscillations or displacement of the rotor, are measured by the sensors 20 (a plurality of sensors are provided around the periphery), and are processed in the control device 21 so that magnetic fields are produced in the coil assembly 23 to damp the oscillations and restore the rotor to its neutral position.

The rotor is stabilized in an axial direction by the axial bearing unit formed by the permanent magnets 18 cooperating with the parts 14, 15. The two magnets 18, which are permanent magnets in the illustrated embodiment, are in the form of axially polarized annular magnets which encircle the rotor. They are axially spaced apart by a distance 26 such that like poles, the south poles in the present case, face one another. The coil assembly 23 already described is arranged in the axial space 26 between the magnets 18, so that its ferromagnetic core 24 is used for conducting magnetic flux in the region between the two magnets 18.

Owing to the fact that the magnets 18 are polarized in opposite directions, the magnetic flux in this central region is intensified and, concentrated, passes into the ferromagnetic parts 14, 15 of the rotor. The interstice formed in the ferromagnetic material between the two shoulders 16 of the parts 14, 15 is also located in this central region or space 26. By means of this interstice, and assisted by the field-concentrating action of the opposite directions of polarization of the magnets 18, a strong field concentration occurs in the region of the interstice between the shoulders 16. The directions of magnetic flux oppose one another in the parts 14, 15 of ferromagnetic material and are associated with two ferromagnetic flux paths 27, 28 shown by broken lines in FIG. 1.

In the illustrated embodiment, the axial lengths of the parts 14 and 15 are somewhat greater than the axial lengths of the magnets 18, although the overall axial dimension over the two parts 14, 15 is such that, including the relatively short distance between the shoulders 16, their outer end faces 29, 30 are normally still located in the region surrounded by the magnets 18. The magnetic flux enters the magnets 18 again from these ends faces 29, 30 of the parts 14, 15.

In the case of a force acting upon the rotor in an axial direction, a certain amount of axial displacement occurs which varies the described distribution of the field. As a result of the great change in the field in the region of the shoulders 16 and the end faces 29, 30, this displacement is opposed by a very strong magnetic force. Thus, the bearing has a high axial "spring stiffness".

It may be mentioned at this juncture that the described axial bearing, which does not require any active control for axially stabilizing a body, produces a relatively strong destabilizing force in a radial direction. In other words, displacement of the rotor 11 from its position which is neutral in a radial direction produces a radial force which seeks to displace the rotor further from this neutral position. However, it has been established that it is readily possible to compensate for these destabilizing forces by means of the lateral bearing described.

A special advantage of the described bearing unit 17 is that it not only provides a particularly effective axial bearing but also contributes to the fact that the radial bearing 19 operates in a particularly effective manner. It has already been set forth in the previously mentioned published German Patent Specification No. 2,213,465 disclosure of which is contained in U.S. Pat. No. 3,845,997 that the premagnetization of the annular coil assembly 23 (and all other electromagnet elements which may be used for radial journalling) substantially increases the efficacy and the efficiency, that is the force exerted upon the rotor compared with the control energy employed for this purpose. Because of the magnetic fields required for controlling or damping lateral displacement an inhomogeneity is produced around the periphery of the air gap 31 between the rotor and the stator which would lead to magnetic reversal and eddy current losses in the rotor and would decelerate the latter (magnetic bearing friction). In the illustrated embodiment, a substantial portion of the field required for axial journalling is conducted through the annular coil assembly 23 and thus premagnetizes the lateral bearing 19. It is also advantageous that the ferromagnetic annular core conducts the magnetic flux in a very satisfactory manner. The regulating deviations, effected by the regulating signals from the control device 21, are now superimposed on this high premagnetization. Owing to the fact that the forces exerted are dependent upon the total magnitude of the magnetic flux, these regulating deviations need only be very small, so that the "magnetic bearing friction", solely upon the amplitude of the deviations, is also very small.

A further advantage of the bearing is that the useful range of the axial deflection is relatively great, despite a high ratio of axial force to axial displacement (spring stiffness). Primarily, the effect of the air gap 31 on the transverse bearing 19 is substantially constant, even in the case of large axial displacement, The overall length over the parts 14, 15 and the space 26 between the permanent magnets 18 depends upon the required characteristics of the bearing, or upon the forces acting upon the bearing. Stabilization is frequently required only towards one side, i.e. in one attitude, if for example, a rotor has to be journalled with its axis vertical and the axial forces required are no greater than those which are applied, in any case, by the force of gravity on the rotor. In this case, the bearing need only operate in one direction, which may also influence the design of the ferromagnetic portions. It may be mentioned that, in the case of a horizontal bearing as shown in FIG. 1, the magnetic forces of the axial bearing, that is the permanent magnets 18, can also be used to absorb the gravity components which act as a transverse force in this instance, this being effected by retaining the rotor 11 by the radial bearings 19 in a position such that the destabilizing forces of the axial bearing 18 exactly cancel the force of gravity. Owing to the extremely good accessibility of the radial bearing, such disadjustment can be readily maintained. Thus, in the illustrated embodiment, it would mean that the rotor is adjusted into a slightly upwardly displaced, off-centre position. Alternatively, it is possible to displace only one of the magnets relative to the centre of the bearing.

FIG. 2 shows a hollow rotor 11' journalled with a vertical rotary axis. The top and bottom bearing elements 17' are of identical construction and their basic construction corresponds to that of the bearing elements shown in FIG. 1. However, they are in the form of internal bearings, i.e. the hollow rotor 11' carries the ferromagnetic parts 14', 15' on the inside of bores 32 in covers 33. Each of the bearing units 17' extends into the respective bore 32 which, so to speak, is lined with the ferromagnet parts 14',15', wherein the bearing units 17' may be mounted, for example, on stub shafts 34. The radial bearing 19, including the sensors, the control device and the coil assembly 23 can be identical to the radial bearings 19 illustrated in FIG. 1, with the exception of the dimensional ratios. Preferably, in the present case, the magnets 18' are in the form of axially polarized disc magnets, in order to be able to accommodate the greatest possible amount of permanent magnetic material in a small space. Alternatively, however, they may be in the form of annular magnets. The coil assembly 23 is again accommodated in the space or interstice 26' between the magnets 18', and the mode of operation is the same as that of the arrangement illustrated in FIG. 1. It will be seen that the force of gravity which acts in an axial direction in this case, has displaced the rotor to a certain extent in a vertical direction, although this displacement has been exaggerated in the illustration.

The modification illustrated in FIG. 3 relates only to the rotor, while the bearing unit 17 is identical to that shown in FIG. 1. The same reference numerals are also used. It will be seen that, in this instance, the two parts 14", 15" of the ferromagnetic material of the rotor no longer have any outer end faces which are still located in the region of the magnets 18. Thus, the only shoulders used for axial stabilization are the shoulders 16 which are directed towards one another. In this instance, it is necessary to forego some of the axial carrying capacity, although, in specific embodiments dependent upon the type of rotor, it may be a substantial advantage that, with the exception of the break in the region of the shoulders 16, the parts 14", 15" can be in the form of continuous tubes. In this connection, it may be mentioned that it is particularly advantageous to construct the ferromagnetic parts in the form of tubes, since the ferromagnetic material of the tubes is concentrated at the location where it is needed, that is in the region of the air gap. Furthermore, it is also advantageous with respect to the strength of the entire rotor if the usually high-tensile ferromagnetic material, such as steel, is located in the outer edge region. In the case of FIG. 3, the parts 14", 15", for example, can assume the actual carrying function of the rotor 11" and, in the region of the shoulders 16, that is the gap between the parts, can be interconnected only by a type of connection plug 35 made from non-ferromagnetic material onto which the portions 14", 15" are shrunk fitted or mounted in some other way.

The embodiment illustrated in FIG. 4 corresponds, with respect to the construction of the rotor, to the shaft end illustrated at the left-hand of FIG. 1, even though the parts 14, 15, the construction otherwise being the same, are illustrated in the present instance such that there is a greater axial distance between their outer end faces 29, 30 than between the outer faces of the magnets. As already mentioned, this construction depends upon the prerequisites and required properties of the bearing and can be optimized accordingly. However, the bearing unit 17" is somewhat modified, although the radial bearing with the coil assembly 23 etc. again corresponds exactly to the radial bearing shown in FIG. 1 and is provided with the same reference numerals.

The magnets are again in the form of spaced annular magnets 18" which are axially polarized and which are arranged one on each side of the radial bearing coil assembly 23. However, a further annular magnet 36 which is radially polarized, or a corresponding ring of bar magnets or segments arranged adjacent to one another, is arranged in the space outside the radial bearing coil assembly 23 and between the magnets 18". It will be seen that the magnetic field passing through the coil assembly 23 towards the shoulders 16 is thereby further intensified, so that, with substantially the same overall size, the load bearing capacity in an axial direction and, owing to the greater premagnetization, in a radial direction can be increased. A limit is set only by the magnetic saturation of the ferromagnetic material of the parts 14, 15 which have to be correspondingly dimensioned.

The embodiment illustrated in FIG. 5, in which the left-hand portion of the rotor is again identical to that shown in FIG. 1, has only one permanent magnet 18''' which is polarized in a radial direction. A radial bearing coil assembly 23' of very flat construction is arranged between the permanent magnet 18''' and the ferromagnetic parts 14, 15 and co-operated with sensors and a control device of the type shown in FIG. 1 and is also of substantially the same construction with an annular core and a toroidal coil wound therearound. Here also, the magnetic flux is concentrated in the region of the shoulders 16 directed towards one another, and two magnetic flux paths are formed which extend in different axial directions in the two ferromagnetic parts. Here, the efficacy can be further increased by appropriate provision in the stator for completing the magnetic flux path. This arrangement is not as effective as the arrangement having annular magnets which are axially polarized in opposite directions, although it is substantially simpler and, here also, substantially the entire magnetic field again passes through the radial bearing coil assembly for the purpose of premagnetizing the latter.

Each of the embodiments described above relates to a complete bearing unit, since such a combination of axial and radial bearings has many advantages which result from the co-operation between the individual elements and magnetic fields. However, it may be mentioned that the described axial bearing alone also offers substantial advantages compared with the known axial bearing if a radial bearing, or a magnetic radial bearing, is not desired at the corresponding location, or the radial bearing should be arranged so as to be spatially separated from the axial bearing for any functional or structural reasons. The functions of the radial bearing and the axial bearing can be exchanged under certain conditions, although, here also, the advantages are substantially in favour of the arrangement having a passive axial bearing and an active radial bearing.

FIG. 6 shows an axial bearing which is of substantially the same construction as that shown in FIG. 3 with respect to the design of the rotor. Thus, the same parts are provided with the same reference numerals as in FIG. 3. Similarly, two permanent annular magnets 18 are provided which are identical to those shown in FIG. 3 with respect to construction, direction of polarization and the manner in which they are arranged. An annular ferromagnetic core 40 is arranged between the two annular permanent magnets and bridges the entire space between the two magnets 18. An annular coil 41 is adjacent to this annular core 40 and is arranged between the magnets 18, namely within the ferromagnetic core 40 in the present embodiment. In the present instance, the effective magnetic direction is the axial direction of the rotor, in contrast to the radial bearing toroidal coil assemblies 23 whose effective magnetic direction in the ferromagnetic members is the circumferential direction. Thus, in the illustrated embodiment, the coil assembly is wound in the circumferential direction of the rotor.

When a non-regulated or regulated direct current is fed to this coil assembly, it produces a magnetic flux whose flux path 43 extends through the ferromagnetic core 40 and through the rotor parts 14" and 15".

This electromagnetic flux path, in conjunction with the two permanent magnetic flux paths which are formed by the magnets 18 in the present case, permits axial forces to act upon the rotor. These axial forces occur by addition and subtraction of the magnetic fields at the various parts of the rotor. Their magnitude is dependent upon the current flowing through the coil assembly 41.

It is possible to use the coil assembly 41 to control and to regulate the axial position of the rotor or the bearing stiffness. In this case, control would mean influence or adjustment by permanent adjustment of the current flowing through the coil assembly 41, while regulation might mean supplying to the coil assembly 41 a direct current of variable value in dependence upon the particular change in the position of the rotor. Such possibility is indicated in FIG. 6. A sensor 45, co-operating with a collar 44 on the rotor, applies its signals to a control device 46 which is connected to an external source of current and, after corresponding amplification or conversion of the sensor signals, applies output signals to the coil assembly 41. In this instance, the entire control range is available, i.e. by feeding current to the coil assembly in different directions the coil assembly can produce not only magnetic fields of differing magnitude, but also magnetic fields of differing orientation. Thus, it is possible to regulate or control the axial position and stiffness of the axial bearing in a particularly advantageous manner.

The axial bearing is not combined with a radial bearing in the present embodiment. However, the ferromagnetic core 40 can be the core of a coil of a radial bearing which, for example, can be in the form of a four-pole rotary field stator. The illustrated embodiment of the rotor is advantageous if the current flow in the coil assembly 41 is to cause axial displacement.

On the other hand, if the rotor is to be maintained in a fixed position, it is advantageous also to use the axially stabilizing action of the forces of the other two outer shoulders 29, 30 as illustrated in FIG. 7. The rotor shown in FIG. 7 is constructed in the same manner as the rotor shown in FIGS. 1, 4 and 5. Here also, the same parts are provided with the same reference numerals. The permanent magnets 18, the manner in which they are arranged and their direction of polarization etc., are the same as those shown in, for example, FIG. 1. A radial bearing 19' is also arranged between the permanent magnets 18 and has an annular ferromagnetic core 24' and a toroidal coil 25' surrounding the core 24'. However, this toroidal annular coil is also wound around an annular coil 41' which is arranged on the inside adjacent to the ferromagnetic core 24' and whose winding and effective directions are identical to those of the coil assembly 41 shown in FIG. 6. This coil 41' is likewise connected to a control device 46 which is constructed to process sensor signals from a sensor 45 which, in the present case, cooperates with the outer shoulder 30 of the part 15 and thus senses the axial position of the rotor.

The function is the same as that described with reference to FIG. 6, i.e. the coil 41' also forms a third magnetic flux path which influences the permanent magnetic flux paths of the magnets 18 which are effective for axial journalling. The total magnetic field is additionally superimposed by the magnetic field of the radial bearing coil 19'. In the present case, a particularly compact combined radial and axial bearing is provided in which an axial degree of freedom can be regulated in addition to the radial degrees of freedom. Instead of locating the coil 41' in the interior of the toroidal coil 25', it is also possible to locate the coil 41' outside the coil 25 in the case of a radial bearing coil assembly such as illustrated, for example, in FIG. 1, this being effected by, for example, inserting a coil, which is flat in a radial direction, into the interior of the radial bearing coil.

We claim:

1. In a magnetic bearing for supporting two members against movement in a direction; two ferromagnetic parts on one of said members, said ferromagnetic parts respectively defining two mutually facing shoulders, said shoulders being spaced by a non-ferromagnetic gap in said direction, and magnet means arranged on the other of said members, said magnet means and said ferromagnetic parts defining two flux paths which respectively pass through said two ferromagnetic parts at said shoulders in opposite directions to exert a stabilizing effect upon said bearing in said direction, which direction is substantially parallel to said opposite flux path directions in said ferromagnetic parts, said magnetic field being substantially constant and exerting a destabilizing effect on said bearing in a direction transverse to said direction.

2. A bearing according to claim 1, in which said two parts define outer end faces which face away from one another and which are located in the region of the magnetic field of said magnet means.

3. A bearing according to claim 1 which is a rotary bearing and in which said ferromagnetic parts comprise annular parts and said shoulders thereon define an interstice between said two ferromagnetic annular parts.

4. A bearing according to claim 1 in which said magnet means comprises two magnets which are arranged spaced apart on said other member in said direction and which are polarized in alignment with this direction but in opposite directions to one another said shoulders on said ferromagnetic parts being located in the region of the space between said two magnets.

5. A combination according to claim 1 further comprising an actively controlled electromagnetic lateral bearing including a coil assembly which is arranged in the magnetic field of said magnet means whereby said two magnetic flux paths pass through said coil assembly.

6. A bearing according to claim 5, in which said coil assembly is located in the direction of the magnetic flux between said magnet means and the regions contiguous to said shoulders on said ferromagnetic parts.

7. A combination according to claim 4 further comprising an actively controlled electromagnetic lateral bearing including a coil assembly located in the space formed between said two magnets.

8. A bearing according to claim 5 in which said coil assembly has a ferromagnetic core which is arranged to conduct the magnetic flux of said two magnetic flux paths.

9. A bearing according to claim 8, in which said coil assembly and said magnet means have internal diameters, that of said magnet means being at least equal to that of said coil assembly.

10. A bearing according to claim 2 in which said ferromagnetic parts and said magnet means have overall axial lengths, that of said ferromagnetic parts being greater than that of said magnet means.

11. A bearing according to claim 2 in which said magnet means define a centre thereof and said ferromagnetic parts are offset towards said centre relative to said magnet means.

12. A bearing according to claim 1 further comprising an electromagnetic coil which is arranged in the region of said shoulders to produce a third magnetic flux path.

13. A bearing according to claim 12, in which said electromagnetic coil has an axial effective direction.

14. A bearing according to claim 12 in which said magnetic means comprises two axially spaced permanent magnets and said electromagnetic coil is arranged between said two axially spaced permanent magnets.

15. A bearing according to claim 14, in which said electromagnetic coil is provided with a ferromagnetic core which is arranged between said two magnets.

16. A combination according to claim 12 which further comprises lateral bearing means, said electromagnetic coil being arranged within said lateral bearing means.

17. A bearing according to claim 16, in which said lateral bearing means includes a coil assembly, said electromagnetic coil being surrounded by said coil assembly.

18. A bearing according to claim 4 which is a rotary bearing and in which said two magnets are axially polarized.

19. A bearing according to claim 1 which is a rotary bearing and in which said magnet means comprises a single magnet polarized in a radial direction.

20. A bearing according to claim 1 in which said one member and said other member respectively comprise a rotor and a stator, said magnet means on said stator being annular and said ferromagnetic parts on said rotor being located concentrically within said annular magnet means.

21. A bearing according to claim 1 in which said one member and said other member respectively comprise a rotor and a stator, said ferromagnetic parts being annular and being located in a hollow portion of said rotor and said magnet means on said stator being located concentrically within said annular ferromagnetic parts.

* * * * *